(12) United States Patent
Sylvain et al.

(10) Patent No.: US 7,920,551 B2
(45) Date of Patent: Apr. 5, 2011

(54) MULTIPLE ACCESS SERVICE CONVERGENCE

(75) Inventors: Dany Sylvain, Gatineau (CA); Samuel H. Christie, IV, Cary, NC (US)

(73) Assignee: Genband US LLC, Plano, TX (US)

( * ) Notice: Subject to any disclaimer, the term of this patent is extended or adjusted under 35 U.S.C. 154(b) by 805 days.

(21) Appl. No.: 11/911,631

(22) PCT Filed: Mar. 8, 2006

(86) PCT No.: PCT/IB2006/000501
§ 371 (c)(1),
(2), (4) Date: Oct. 15, 2007

(87) PCT Pub. No.: WO2007/029056
PCT Pub. Date: Mar. 15, 2007

(65) Prior Publication Data
US 2009/0052385 A1    Feb. 26, 2009

Related U.S. Application Data

(60) Provisional application No. 60/659,452, filed on Mar. 8, 2005.

(51) Int. Cl.
*H04L 12/66* (2006.01)
*H04L 12/28* (2006.01)
(52) U.S. Cl. .................. 370/352; 370/401; 370/410
(58) Field of Classification Search .................. 370/352, 370/401, 410, 467
See application file for complete search history.

(56) References Cited

U.S. PATENT DOCUMENTS

| | | | |
|---|---|---|---|
| 7,522,632 B2 * | 4/2009 | La Porta et al. ............... | 370/466 |
| 2003/0002524 A1 * | 1/2003 | Feldman et al. ............... | 370/465 |
| 2003/0118006 A1 * | 6/2003 | Yang et al. ..................... | 370/352 |
| 2003/0161386 A1 * | 8/2003 | Schilling ....................... | 375/141 |
| 2004/0136324 A1 * | 7/2004 | Steinberg et al. ............. | 370/238 |

(Continued)

FOREIGN PATENT DOCUMENTS

EP    1109416 A2    6/2001

(Continued)

OTHER PUBLICATIONS

3GPP TS 23.228 V5.13.0, "3rd Generation Partnership Project; Technical Specification Group Services and System Aspects, IP Multimedia Subsystem (IMD); Stage 2 (Release 5)," Dec. 2004, Section 4 and Section 5.4.

(Continued)

*Primary Examiner* — Andrew Lee
(74) *Attorney, Agent, or Firm* — Jenkins, Wilson, Taylor & Hunt, P.A.

(57) ABSTRACT

A mobile terminal is anchored in a control subsystem, which will function as the mobile terminal's home service subsystem. Call signaling for an incoming call is routed to the control subsystem, which will provide call processing. The call processing may include determining how to route the call to the mobile terminal. Call signaling may be provided to the mobile terminal via the packet subsystem while the bearer path for the incoming call may be established to the mobile terminal though either the circuit-switched subsystem or the packet subsystem. When the mobile terminal is capable of supporting local wireless communications, the bearer paths for incoming calls may be provided via a local wireless subsystem. The subsystem chosen for the bearer path may be based on whether there is sufficient bandwidth to support the bearer path over an available packet-based connection.

26 Claims, 7 Drawing Sheets

U.S. PATENT DOCUMENTS

| | | | |
|---|---|---|---|
| 2004/0184444 A1* | 9/2004 | Aimoto et al. | 370/352 |
| 2005/0141493 A1* | 6/2005 | Hardy et al. | 370/356 |
| 2005/0190789 A1* | 9/2005 | Salkini et al. | 370/466 |
| 2005/0195815 A1* | 9/2005 | Chaudhuri | 370/389 |
| 2006/0146799 A1* | 7/2006 | Baldwin et al. | 370/352 |
| 2006/0146859 A1* | 7/2006 | Baldwin et al. | 370/438 |

FOREIGN PATENT DOCUMENTS

| | | |
|---|---|---|
| EP | 1182900 A1 | 2/2002 |
| WO | 02/28014 A2 | 4/2002 |
| WO | 2005/011207 A1 | 2/2005 |
| WO | 2006/138736 A2 | 12/2006 |

OTHER PUBLICATIONS

Ivankovic, T., "Support of Multimedia Broadcast/Multicast Service in UMTS Networks," Proceedings of the 8th International Conference on Telecommunications, 2005; ConTEL2005; vol. 1, pp. 91-98.

International Search Report for PCT/IB2006/000501, mailed May 8, 2007.

First Office Action for Chinese Application No. 2006800154959 (Apr. 29, 2010).

"3$^{rd}$ Generation Partnership Project; Technical Specification Group Services and System Aspects; Report on alternative architectures for combining CS Bearers with IMS; Release 6," 3GPP 23.899 V1.0.0, pp. 1-52 (Dec. 2004).

* cited by examiner

MULTIPLE ACCESS SERVICE CONVERGENCE

This application claims the benefit of U.S. provisional patent application Ser. No. 60/659,452, filed Mar. 8, 2005, the disclosure of which is hereby incorporated by reference in its entirety.

FIELD OF THE INVENTION

The present invention relates to communications, and in particular to providing a centralized control domain for supporting features and services over circuit-switched domains and packet domains.

BACKGROUND OF THE INVENTION

The evolution of packet-based communications has lead to providing telephony services and features over packet subsystems in addition to circuit-switched subsystems. These packet subsystems were initially supported by local area networks, but are now supported by wireless local area networks and cellular networks. Cellular networks support access to both circuit-switched and packet subsystems through available cellular access networks.

Unfortunately, the circuit-switched subsystems and the packet subsystems are substantially independent. Given the existing infrastructure, most call control and feature support is provided in the circuit subsystem. Various multimedia subsystems, such as the Third Generation Partnership Project (3GPP) Internet Protocol (IP) Multimedia Subsystem (IMS), are separate from, but associated with, the packet subsystem and have evolved to support packet-based services and features for the packet subsystems. The IMS is evolving to provide only basic interaction with the circuit-switched subsystem and is optimized for Session Initiation Protocol (SIP) based services. As such, IMS has limited influence or control over the circuit-switched subsystem.

In certain IMS configurations, packet-based services for a mobile terminal are interrupted when the mobile terminal is involved in a circuit-switched call. Further, there is often limited capacity to support voice applications using voice over IP (VoIP) in the packet subsystem. In other IMS configurations, the IMS can interact with the circuit-switched subsystem when establishing calls as well as support VoIP in the packet subsystems. However, once a call is established in the circuit-switched subsystem, the IMS loses control of the call and therefore cannot provided additional services associated with the call in the circuit-switched subsystem. The inability to provide overall control of the circuit-switched and packet subsystems in an orchestrated and comprehensive manner limits the availability of services and features to telephony users, especially those with mobile terminals that support communications over both the circuit-switched and packet subsystems.

As such, there is a need for a technique for providing effective and efficient control over both circuit-switched subsystems and packets subsystem to enable unfettered support of services and features to users via mobile terminals.

SUMMARY OF THE INVENTION

The present invention moves service control, including call control, from packet and circuit-switched subsystems to a control subsystem, such as the IP Multimedia Subsystem (IMS). A user's mobile terminal is anchored in the control subsystem, which will function as the mobile terminal's home service subsystem. Instead of an incoming call intended for the mobile terminal being routed to the circuit-switched subsystem, call signaling for the incoming call is routed to the control subsystem, which will provide call processing. The call processing may include determining if and how to route the call to the mobile terminal. Call signaling may be provided to the mobile terminal via the packet subsystem, while the bearer path for the incoming call may be established to the mobile terminal though either the circuit-switched subsystem or the packet subsystem. When the mobile terminal is capable of supporting local wireless communications, the bearer paths for the incoming calls may be provided via a local wireless subsystem. The subsystem chosen for the bearer path may be based on whether there is sufficient bandwidth to support the bearer path over an available packet-based connection, such as that provided by the packet subsystem or local wireless access.

Since call processing is provided by the control subsystem instead of the circuit-switched subsystem, the control subsystem will have continued control over the call and can operate to provide additional services in association with the call, even once the call is established. The additional services may be supported in either the circuit-switched or packet subsystems as well through local wireless access, if available. Further, the control subsystem may support outgoing calls, wherein the call signaling and bearer paths for the outgoing calls may be bifurcated between the packet and circuit-switched subsystems, respectively. Depending on available bandwidth via packet-based connections, the bearer paths may be established over packet subsystems. When local wireless access is available, call signaling may be provided and the corresponding bearer paths may be established over the local wireless access.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention moves service control, including call control, from packet and circuit-switched subsystems to a control subsystem, such as the IP Multimedia Subsystem (IMS). A user's mobile terminal is anchored in the control subsystem, which will function as the mobile terminal's home service subsystem. Instead of an incoming call intended for the mobile terminal being routed to the circuit-switched subsystem, call signaling for the incoming call is routed to the control subsystem, which will provide call processing. The call processing may include determining if and how to route the call to the mobile terminal. Call signaling may be provided to the mobile terminal via the packet subsystem, while the bearer path for the incoming call may be established to the mobile terminal though either the circuit-switched subsystem or the packet subsystem. When the mobile terminal is capable of supporting local wireless communications, the bearer paths for the incoming calls may be provided via a local wireless subsystem. The subsystem chosen for the bearer path may be based on whether there is sufficient bandwidth to support the bearer path over an available packet-based connection, such as that provided by the packet subsystem or local wireless access.

Since call processing is provided by the control subsystem instead of the circuit-switched subsystem, the control subsystem will have continued control over the call and can operate to provide additional services in association with the call, even once the call is established. The additional services may be supported in either the circuit-switched or packet subsystems as well through local wireless access, if available. Further, the control subsystem may support outgoing calls, wherein the call signaling and bearer paths for the outgoing calls may be bifurcated between the packet and circuit-switched subsystems, respectively. Depending on available bandwidth via packet-based connections, the bearer paths may be established over packet subsystems. When local wireless access is available, call signaling may be provided and the corresponding bearer paths may be established over the local wireless access.

Figure 1:
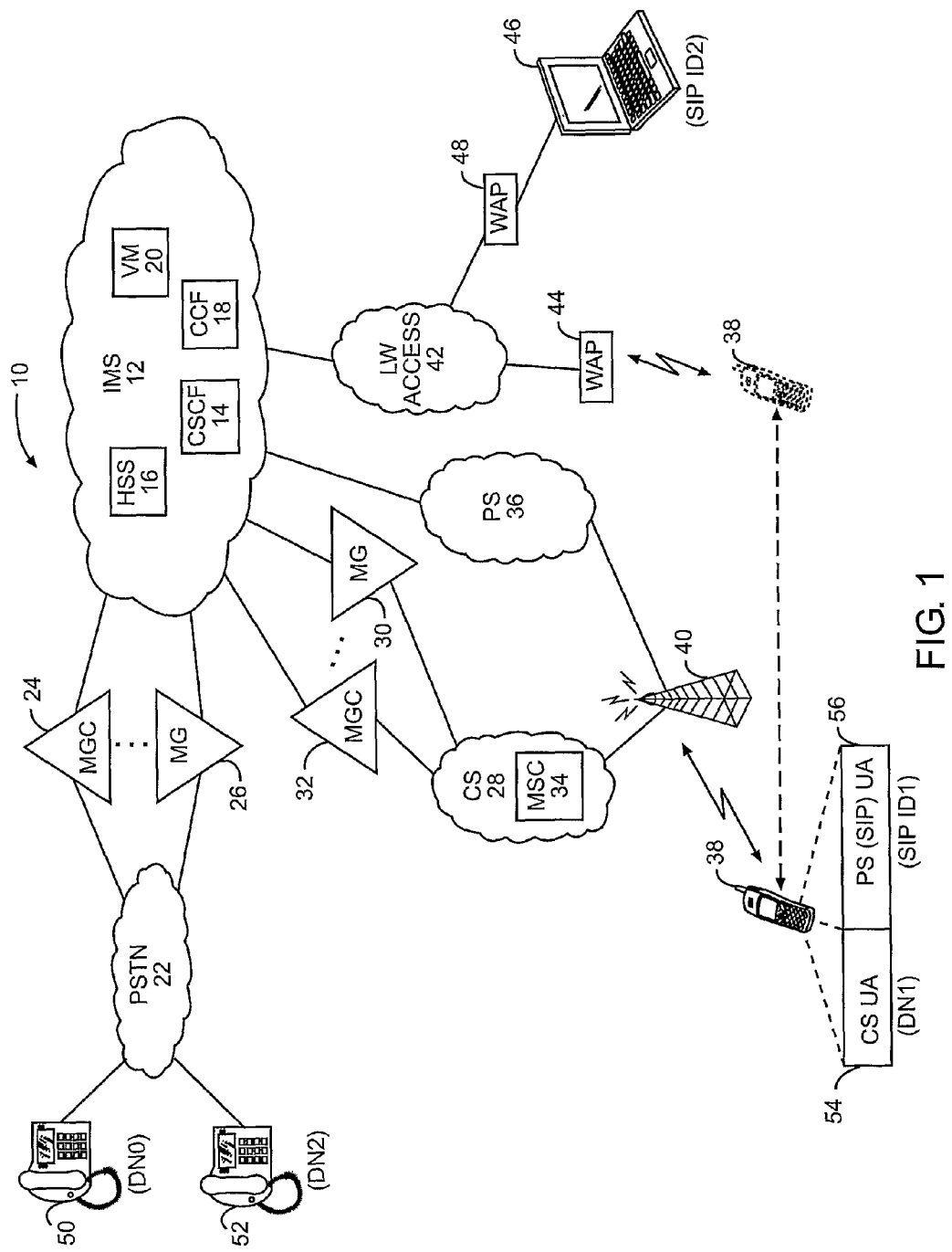
FIG. 1 is a block representation of a communication environment according to one embodiment of the present invention.

Prior to delving into the details of the present invention, an overview of a communication environment 10 in which the present invention may be practiced is provided in FIG. 1. The communication environment 10 is centered about a packet-based control domain, which is represented by an IP multimedia subsystem (IMS) 12. Those skilled in the art will recognize that other subsystems similar in concept to the IMS 12 may be used. The IMS 12 includes a call session control function (CSCF) 14, which represents one or more Session Initiation Protocol (SIP) proxies that are capable of supporting various types of calls and communication sessions between SIP endpoints or proxies therefor. A Home Subscriber Server (HSS) 16 is provided in the IMS 12 to maintain location and routing information for endpoints associated with the IMS 12. The HSS 16 functions in an analogous fashion to a home location register (HLR) in a cellular communication environment. The present invention creates a new function, which is referenced as a continuity control function (CCF) 18, in the IMS 12. The continuity control function 18 provides the primary call control processing for the present invention. The processing will be described in further detail later in the specification. Additionally, the IMS 12 may be associated with a voicemail system (VM) 20.

The IMS 12 may be associated with a public switched telephone network (PSTN) 22, wherein call signaling is passed between the IMS 12 and the PSTN 22 through a media gateway controller (MGC) 24. The MGC 24 is associated with a media gateway (MG) 26 through which bearer paths are established between the PSTN 22 and the IMS 12. For cellular communications, circuit-switched communications are supported through a circuit-switched subsystem (CS) 28, which is associated with the IMS 12 through a media gateway 30 and an associated media gateway controller $32_{[DS1]}$. At the heart of the circuit-switched subsystem 28 will generally reside one or more mobile switching centers (MSC) 34. The media gateway controller 32 will support call signaling between the MSC 34 and the IMS 12 and cooperate with the media gateway 30 to establish bearer paths extending from the circuit-switched subsystem 28 through the IMS 12.

For packet communications, the cellular network will include a packet subsystem (PS) 36, which is coupled to the IMS 12. The circuit-switched subsystem 28 and the packet subsystem 36 are accessible by a mobile terminal 38 through a common network of base stations 40. Generally, circuit-switched communications are supported by the circuit-switched subsystem 28 while packet communications are supported by the packet subsystem 36. Notably, the packet subsystem 36 may be the cellular network's packet data network, which provides relatively high bandwidth access, or a relatively low bandwidth access mechanism, such as Unstructured Supplementary Service Data (USSD).

In certain embodiments, the mobile terminal 38 may support cellular communications as well as local wireless communications. Local wireless communications are provided by relatively limited range wireless access technologies, such as those supported by the IEEE's 802.11 wireless local area network standards and the Bluetooth specification or provided by longer range wireless access such as IEEE's 802.16 and 802.20. As such, the IMS 12 may be associated with local wireless access 42, which includes a wireless access point (WAP) 44 supporting local wireless communications with the mobile terminal 38 when the mobile terminal 38 is within local wireless communication range. The local wireless access 42 may support any number of endpoints, such as a first remote terminal 46, which is in communication range or connected to a WAP 48.

Prior to the present invention, the mobile terminal 38 would have been homed within the circuit-switched subsystem 28. Incoming calls from the PSTN 22 would be received first by the home MSC 34 or gateway MSC within the circuit-switched subsystem 28. With the present invention, the IMS 12 acts as the home network for the mobile terminal 38. As such, the home network for the mobile terminal 38 is no longer in the cellular communication environment, but resides in a packet-based central control domain, such as the IMS 12. Anchoring the mobile terminal 38 in the IMS 12 means that incoming calls from any domain will be routed to the mobile terminal 38 through the IMS 12, and through the continuity control function 18 in particular. By anchoring the mobile terminal 38 in the IMS 12, all service interactions associated with the mobile terminal 38 may be managed in the IMS 12, regardless of whether the service interactions invoke services in the circuit-switched subsystem 28 or the packet subsystem 36.

In general, handling of an incoming call will take place as follows. Initially, the incoming call is received via the IMS 12 by the continuity control function 18, which will determine how to route the call to a mobile terminal 38. Call signaling may be provided directly to the mobile terminal 38 through a packet connection provided by the packet subsystem 36. The continuity control function 18 may then interact with the circuit-switched subsystem 28 to establish a bearer path for the incoming call via the circuit-switched subsystem 28. To establish the bearer path in the circuit-switched subsystem 28, the continuity control function 18 may obtain routing information for the establishment of a bearer path from the circuit-switched subsystem 28. Alternatively, the continuity control function 18 may simply route the call through the circuit-switched subsystem 28, wherein the MSC 34 will take charge of establishing the bearer path for the incoming call. As such, the continuity control function 18 may effectively obtain routing information from the circuit-switched subsystem 28 or route the call to the circuit-switched subsystem 28, which will obtain the appropriate routing information and establish the bearer path for the incoming call. In a different embodiment, the mobile terminal 38 may instead initiate a call toward the MGC 32 and the continuity control function 18 after receiving call signaling information via the packet subsystem 36 to establish the bearer path.

For purposes of illustration, incoming calls may be initiated from the first remote terminal 46, which is associated with a communication address of SIP ID2, as well as second and third remote terminals 50 and 52, which are associated with directory numbers DN0 and DN2, respectively. The mobile terminal 38 will have a circuit-switched subsystem user agent (CS UA) 54, which is associated with directory number DN1, and a packet subsystem user agent (PS UA) 56, which is associated with a communication address of SIP ID1. In general, the CS UA 54 supports circuit-switched communications via the circuit-switched subsystem 28, and the PS UA 56 supports packet-based communications via the packet subsystem 36 or local wireless access 42. By anchoring the mobile terminal 38 in the IMS 12 and using the continuity control function 18 as a centralized signaling function, call status and the relative availability of a handset in either of the circuit-switched subsystem 28 or the packet subsystem 36 is always known. Further, the present invention avoids allowing uncontrolled interactions in the circuit-switched subsystem 28.

Figure 2A:
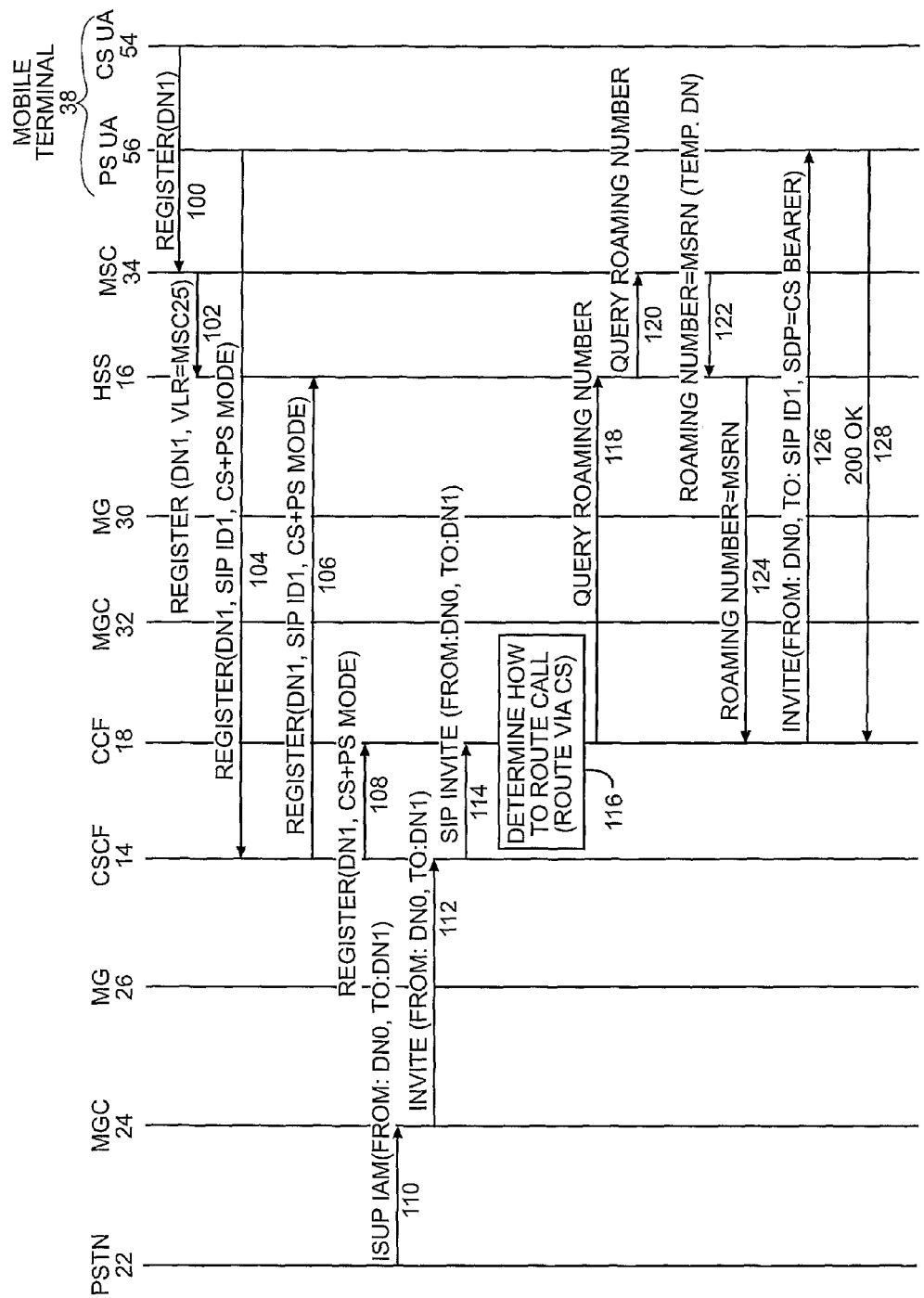
FIGS. 2A and 2B depict a communication flow illustrating processing of an inbound call according to one embodiment of the present invention.
Figure 2B:
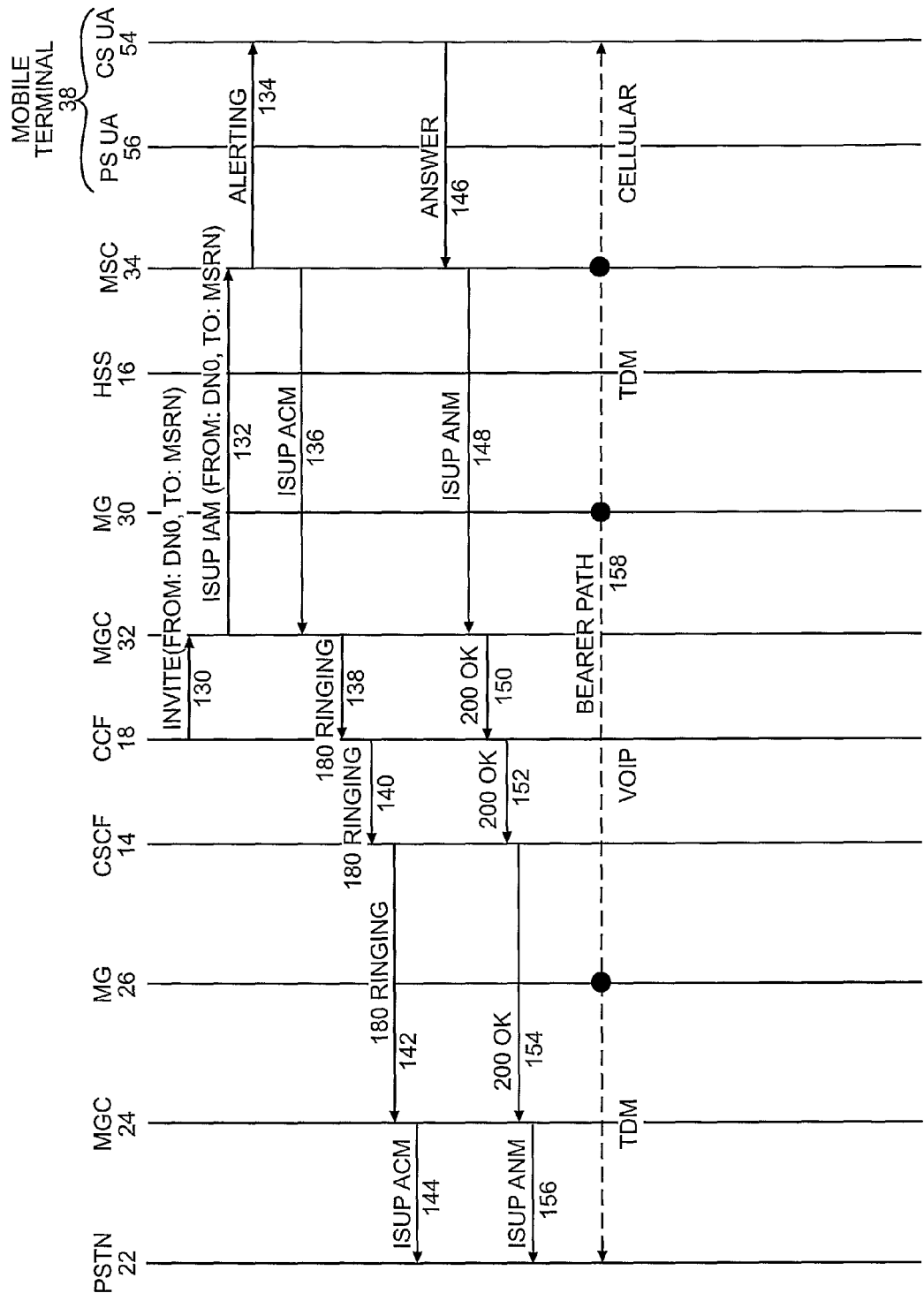

Turning now to FIGS. 2A$_{[DS2]}$ and 2B, a communication flow is illustrated wherein a mobile terminal 38 is anchored (homed) in the IMS 12, hence all processing is provided by the continuity control function 18. The continuity control function 18 will provide call signaling to the mobile terminal 38 via the packet subsystem 36, as well as interact with the circuit-switched subsystem 28 to establish a bearer path to the mobile terminal 38 via the circuit-switched subsystem 28. The continuity control function 18 will maintain knowledge and control of the incoming call and will be able to support additional services in parallel with or associated with the call.

Initially the CS UA 54 of the mobile terminal 38 will register with the MSC 34 in the circuit-switched subsystem 28 (step 100). The MSC 34 will send a Register message to the HSS 16 indicating that the MSC 34 is supporting the mobile terminal 38 (step 102). The HSS 16 is assumed here to incorporate the traditional HLR functionality of cellular networks. On the packet side, the PS UA 56 of the mobile terminal 38 will register the mobile terminal 38 in the IMS 12 by sending a Register message to the CSCF 14 (step 104). The Register message will identify the CS address, DN1, the PS address, SIP ID1, and indicate that the mobile terminal 38 can support communications via the circuit-switched subsystem 28 and the packet subsystem 36 (CS+PS mode). The CSCF 14 will send a Register message to the HSS 16 (step 106), which will maintain the records indicating that the mobile terminal 38 is capable of supporting communications through the circuit-switched subsystem 28 and the packet subsystem 36, as well as associate the PS address, SIP ID1, with the CS address, DN1. The CSCF 14 will also send a Register message to the continuity control function 18 (step 108), which will maintain the relative availability of the mobile terminal 38.

Assume that the second remote terminal 50 initiates a call to the mobile terminal 38 using the CS address, DN1. Upon initiating the call, the PSTN 22 will send an Integrated Services User Part (ISUP) Initial Address Message (IAM) to the media gateway controller 26 (step 110), which will send a corresponding Invite message to the CSCF 14 since the mobile terminal 38 is anchored in the IMS 12 (step 112). Based on the subscriber profile for DN1, the CSCF 14 will send a corresponding Invite message to the continuity control function 18 (step 114). The continuity control function 18 will determine how to route the call based on various criteria, including the fact that the mobile terminal 38 is capable of supporting communications via the circuit-switched subsystem 28 and the packet subsystem 36 in light of the previous registration information (step 116). In this instance, assume the continuity control function 18 determines that the bearer path should be established via the circuit-switched subsystem 28. This would be the case if the packet subsystem 36 cannot effectively support VoIP bearer paths due to limited data rate. As such, the continuity control function 18 must identify the roaming number assigned to the mobile terminal 38 while it is being served by the MSC 34. The continuity control function 18 will send a query for the roaming number to the HSS 16 (step 118), which will then query the MSC 34 for the roaming number associated with the mobile terminal 38 (step 120). The HSS 16 will recognize that the MSC 34 is supporting communications with the mobile terminal 38 based on the prior registration. The MSC 34 will respond with a roaming number, referenced as a mobile service roaming number (MSRN) (step 122). The HSS 16 will forward the roaming number to the continuity control function 18 (step 124).

At this point, the continuity control function 18 will send an Invite message to the PS UA 56 of the mobile terminal 38 via the packet subsystem 36 to alert the mobile terminal 38 that there will be an incoming call having a bearer path through the circuit-switched subsystem 28 (step 126). The Invite message is addressed to the PS UA 56 using its address SIP ID1, and will identify that the bearer path is to be established via the circuit-switched subsystem 28 using the session description protocol (SDP). The PS UA 56 of the mobile terminal 38 will respond with a 200 OK message (step 128). The continuity control function 18 will then initiate interactions with the circuit-switched subsystem 28 to establish the bearer path via the circuit-switched subsystem 28. As such, the continuity control function 18 will send an Invite message to the MGC 32 associated with the circuit-switched subsystem 28 (step 130). The Invite message will identify that the incoming call is from the communication address DN0 associated with the second remote terminal 50, and is to be routed to the roaming number, MSRN, associated with the mobile terminal 38 while it is being supported by the MSC 34. The MGC 32 will then send an ISUP IAM via the circuit-switched subsystem 28 to the MSC 34 (step 132). Again, the ISUP IAM identifies the origination address as DN0 and the destination address as MSRN. The MSC 34 will then send an Alerting message to the CS UA 54 of the mobile terminal 38 (step 134). The mobile terminal 38 will ring or provide an appropriate alert to the user that an incoming call is being received.

In the meantime, the MSC 34 will send an ISUP Address Complete Message (ACM) back to the MGC 32 (step 136), which will send a 180 Ringing message to the continuity control function 18 (step 138). The 180 Ringing message will be forwarded to the CSCF 14 (step 140), which will forward the 180 Ringing message to the MGC 26 (step 142). The MGC 26 will then send an ISUP ACM to the PSTN 22 in traditional fashion (step 144), wherein the second remote terminal 50 will be presented an indication, such as a ringing signal, to indicate that the mobile terminal 38 is being presented with the call.

When the mobile terminal 38 is answered, the CS UA 54 will send an Answer message to the MSC 34 (step 146), which will send an ISUP Answer Message (ANM) to the MGC 32 (step 148). The MGC 32 will send a 200 OK message to the continuity control function 18 (step 150), which will send a 200 OK message to the CSCF 14 (step 152), which will send a 200 OK message to the MGC 26 (step 154). The MGC 26 will then send an ISUP ANM through the PSTN 22 (step 156), wherein the incoming call will be established between the second remote terminal 50 and the CS UA 54 of the mobile terminal 38 (step 158). In particular, the bearer path between the second remote terminal 50 and the CS UA 54 of the mobile terminal 38 will be made up of the following connections: a time-division multiplex (TDM) connection through the PSTN 22 between the second remote terminal 50 and the media gateway 26 associated with the media gateway controller 24; a voice over Internet Protocol (VOIP) connection between the media gateway 26 and the media gateway 30 associated with the MGC 32; a TDM connection between the media gateway 30 and the MSC 34; and a cellular connection between the MSC 34 and the CS UA 54 to the mobile terminal 38. Notably, the MGC 24 and the MGC 32 will coordinate with the respective media gateways 26 and 30 to establish the bearer path through the media gateways 26 and 30.

Depending on the accessibility of the mobile terminal 38 with respect to the IMS 12, the continuity control function 18 may take different actions in response to incoming calls or session requests. Depending on whether the mobile terminal 38 is accessible through the circuit-switched subsystem 28, the packet subsystem 36, or the local wireless access 42, and/or whether the packet subsystem 36 can support VoIP bearer paths or not, different call processing options may be invoked. Call processing options may be based on prior calls or sessions, existing calls or sessions, or the impact of existing calls or sessions on an incoming call, session, or session request. For example, the continuity control function 18 may base call processing on a current status of the mobile terminal 38. The status may correspond to whether the mobile terminal 38 is idle or engaged in a call or session. Status may also relate to whether packet communications are available to the mobile terminal 38. Based on these various criteria, incoming calls or sessions may be allowed to continue in normal fashion, be forwarded, be routed to voicemail, or blocked. Messages intended for the user of the mobile terminal 38 may be allowed, blocked, or buffered, depending on the status of the mobile terminal 38.

If the mobile terminal 38 has broadband access via the local wireless access 42, there will be few limitations on call processing. As such, voice calls and other multimedia sessions may be established and controlled by the continuity control function 18 via the PS UA 56 of the mobile terminal 38. When in a cellular environment where access is provided via the circuit-switched subsystem 28 and the packet subsystem 36, signaling via the packet subsystem 36 is generally available and call processing will react accordingly. In certain cellular environments, such as GSM (Group Special Mobile) and CDMA (code division multiple access) environments, packet communications via the packet subsystem 36 are only available when the mobile terminal 38 is not engaged in a call. As such, the continuity control function 18 will recognize this limitation and react accordingly when handling additional calls and services associated with the mobile terminal 38. When USSD is available, the continuity control function 18 will recognize that low bitrate signaling is generally always available, and will process incoming calls and service requests accordingly.

Figure 3:
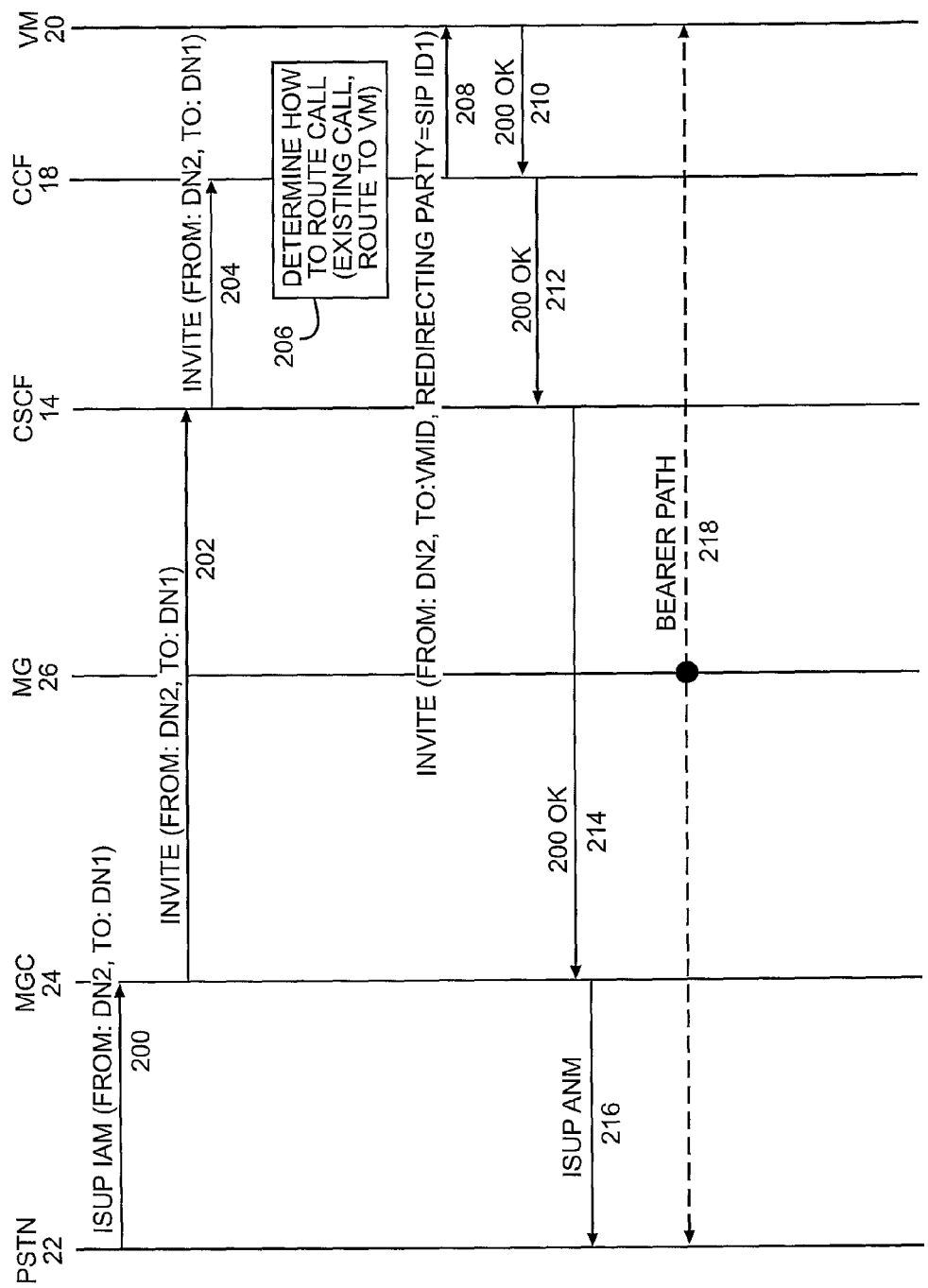
FIG. 3 is a communication flow illustrating routing a second call to a voicemail system while a first call is in progress according to one embodiment of the present invention.

Turning now to FIG. 3, a communication flow is illustrated wherein the mobile terminal 38 is currently engaged in a circuit-switched call via the CS UA 54. In this instance, the continuity control function 18 is configured to route new incoming calls to the voicemail system 20. Initially, an ISUP IAM is presented to the MGC 24 in response to the third remote terminal 52 initiating a call to the mobile terminal 38 using its circuit-switched address, DN1 (step 200). The MGC 24 will send an Invite message to the CSCF 14 (step 202), which will forward the Invite message to the continuity control function 18 (step 204). The continuity control function 18 will respond to receiving the Invite message by determining how to route the call (step 206). In this instance, there is an existing call to the mobile terminal 38 being supported by the CS UA 54, and as such, the incoming call should be routed to the voicemail system 20. The continuity control function 18 will then send an Invite message to the voicemail system 20 (step 208). The Invite message will indicate that the incoming call is initiated from the communication address DN2, and is directed to the communication address of the voicemail system 20, VMID, and was redirected from a party associated with the communication address associated with the PS UA 56 of the mobile terminal 38, SIP ID1. Notably, the continuity control function 18 will be able to recognize that the communication address associated with the CS UA 54 is associated with the communication address of the PS UA 56, and will use the address associated with the PS UA 56 when forwarding calls to the voicemail system 20, which is supported by the IMS 12.

In response to the Invite message, the voicemail system 20 will send a 200 OK message back to the continuity control function 18 (step 210). The continuity control function 18 will forward the 200 OK message to the CSCF 14 (step 212), which will forward the 200 OK message to the MGC 24 (step 214). The MGC 24 will send an ISUP ANM to the PSTN 22 (step 216), wherein a bearer path is established between the third remote terminal 52 and the voicemail system 20 via the media gateway 26, which is associated with the MGC 24 (step 218). Again, the MGC 24 will coordinate with the media gateway 26 to establish the bearer path.

Figure 4:
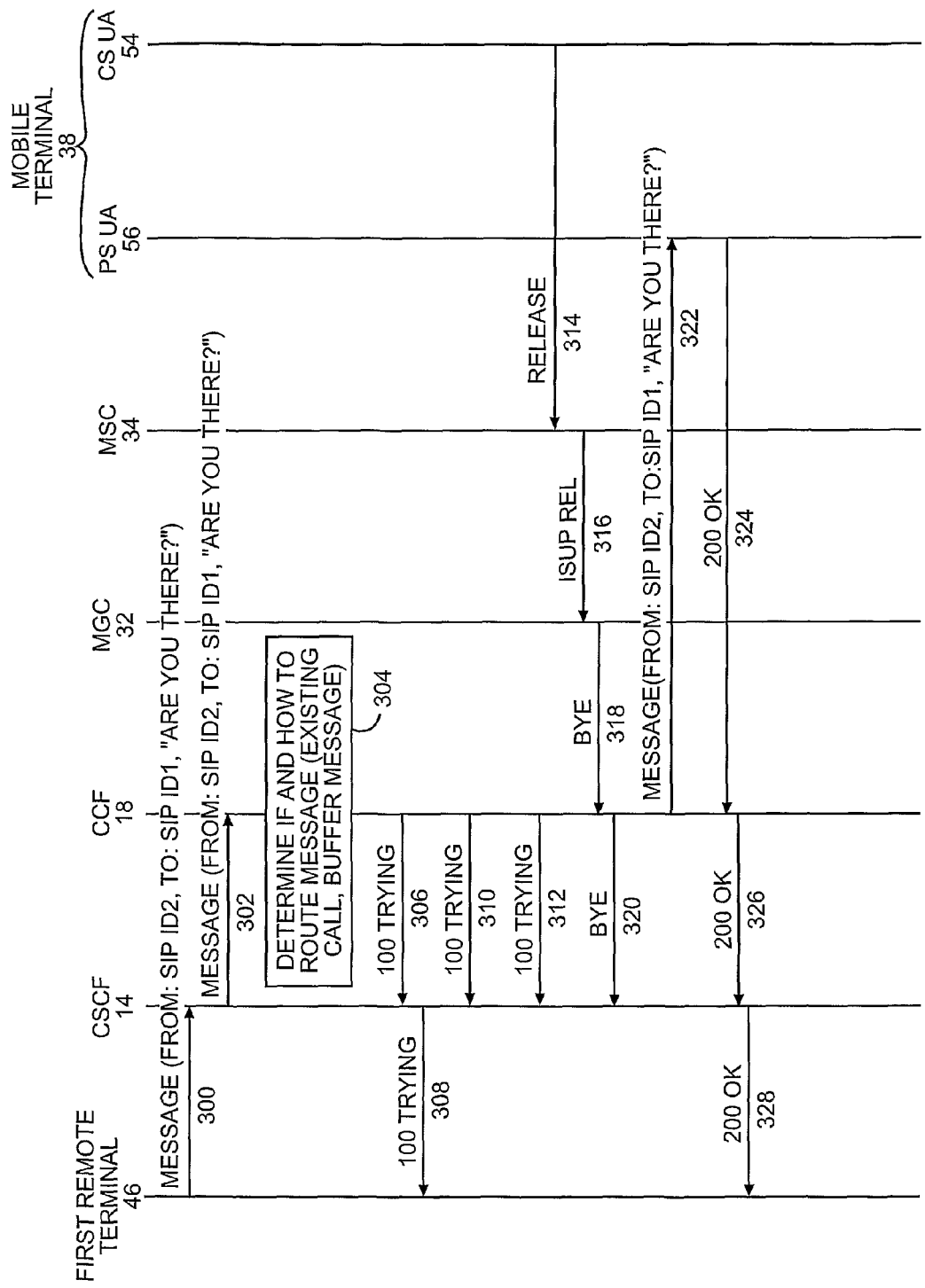
FIG. 4 is a communication flow illustrating the buffering and subsequent delivery of messages according to one embodiment of the present invention.

With reference to FIG. 4, a communication flow is provided wherein a text message is sent from the first remote terminal 46 to the mobile terminal 38, while the mobile terminal 38 is engaged in a call via the CS UA 54. Assume that in the particular cellular communication environment supporting the mobile terminal 38, a text message can be delivered to the mobile terminal 38 while it is engaged in a call. As such, the continuity control function 18 will take the requisite steps to detect that the mobile terminal 38 is engaged in a call, store the message in a buffer, and deliver the message to the mobile terminal 38 once the call ends.

Initially, the first remote terminal 46 will send a text-based message intended for the mobile terminal 38 (step 300). The text-based message includes the text, "Are you there?" and is intended for the communication address SIP ID1, which is associated with the PS UA 56 of the mobile terminal 38. The message is received by the CSCF 14 and forwarded to the continuity control function 18 (step 302). The continuity control function 18 will determine if and how to route the text message to the mobile terminal 38 (step 304). In this instance, the continuity control function 18 will recognize that the mobile terminal 38 is engaged in a call, since the current call was established by and is still under the control of the continuity control function 18. The continuity control function 18 will also recognize that in this situation, the text message cannot be delivered to the mobile terminal 38 via the PS UA 56 while the mobile terminal 38 is engaged in a call via the CS UA 54. As such, the continuity control function 18 will buffer or otherwise store the message and send a 100 Trying message back to the CSCF 14 (step 306), which will forward the 100 Trying message to the first remote terminal 46 (step 308). The continuity control function 18 may periodically send additional 100 Trying messages (steps 310 and 312), with corresponding messages relayed to the first remote terminal 46 (not shown) while the current call remains active and the message is being buffered.

When the call ends, the CS UA 54 of the mobile terminal 38 may send a Release indication to the MSC 34 (step 314), which will send an ISUP Release message (REL) to the MGC 32 (step 316). The MGC 32 will send a Bye message to the continuity control function 18 to indicate that the current call has ended (step 318). The continuity control function 18 will then send a Bye message to the CSCF 14 (step 320). Once the continuity control function 18 recognizes that the call has ended, the text message may be sent to the mobile terminal 38 via the PS UA 56 over the packet subsystem 36 (step 322). The text message will indicate that the message originated from communication address SIP ID2 associated with the first remote terminal 46, and was intended for the communication address SIP ID1, which is associated with the PS UA 56 of the mobile terminal 38. Upon receipt of the text-based message, the mobile terminal 38 will respond with a 200 OK message (step 324), which will be received by the continuity control function 18 and forwarded to the CSCF 14 (step 326). The CSCF may then send a 200 OK message to the first remote terminal 46 to indicate that the text-based message was delivered to the mobile terminal 38 (step 328). In a different embodiment, if USSD is available, the continuity control function 18 may decide to transmit the message via USSD if the message is not too large.

Figure 5:
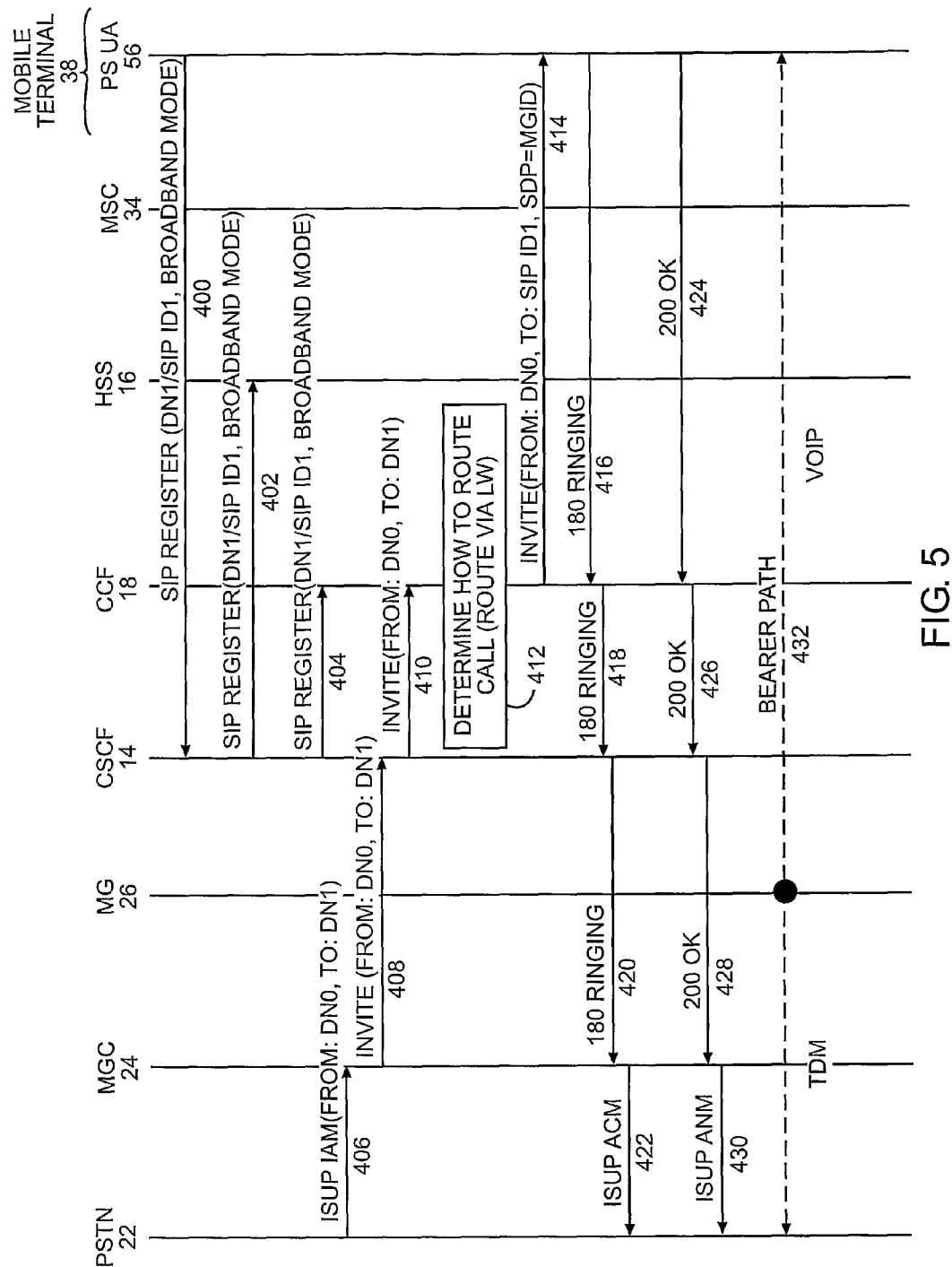
FIG. 5 is a communication flow illustrating routing of an inbound call to a mobile terminal via local wireless access according to one embodiment of the present invention.

With reference to FIG. 5, a communication flow is illustrated wherein the mobile terminal 38 is supported via local wireless access 42, and therefore can operate in a broadband mode outside of or in lieu of cellular communications. Initially, the mobile terminal 38 will recognize that local wireless access is supported via the WAP 44 and will attempt to register with the IMS 12 by sending a Register message to the CSCF 14 (step 400). The Register message may identify the respective communication addresses associated with the mobile terminal 38, DN1 and SIP ID1, as well as indicate that the mobile terminal 38 is operating in a broadband mode wherein high bandwidth communications are possible. The CSCF 14 will provide the registration information to the HSS 16 and the continuity control function 18 to effect registration for the mobile terminal 38 and identify the mode in which the mobile terminal 38 is operating (steps 402 and 404).

Assume that the second remote terminal 50 initiates a call intended for the circuit-switched communication address associated with the mobile terminal 38, DN1. In response, the PSTN 22 will send an ISUP IAM to the MGC 24 (step 406), which will send a corresponding Invite message to the CSCF 14 of the IMS 12 (step 408). The CSCF 14 will forward the Invite message to the continuity control function 18 (step 410). The continuity control function 18 will then determine how to route the call in light of available status information for the mobile terminal 38 in light of defined call processing criteria (step 412). In this instance, the continuity control function 18 will determine that the incoming call should be routed to the mobile terminal 38 via the PS UA 56, since the mobile terminal 38 is operating in a broadband mode and is capable of supporting VoIP communications via the local wireless access 42. Notably, the packet subsystem 36 could theoretically support broadband communications as well.

To route the incoming call to the PS UA 56 of the mobile terminal 38, the continuity control function 18 will send an Invite message to the PS UA 56 of the mobile terminal 38 via the local wireless access 42 (step 414). The continuity control function 18 will direct the Invite message to communication address SIP ID1 associated with the PS UA 56 of the mobile terminal 38. Further, the SDP will identify the communication address MGID associated with the media gateway 26 as the endpoint for the VoIP portion of the bearer path. The mobile terminal 38 will respond by sending a 180 Ringing message to the continuity control function 18 (step 416), which will forward the 180 Ringing message to the CSCF 14 (step 418). The CSCF 14 will forward the 180 Ringing message to the MGC 24 (step 420), which will send an ISUP ACM through the PSTN 22 to indicate that the call has been presented to the mobile terminal 38 (step 422).

When the call is answered, the mobile terminal 38 will send a 200 OK message to the continuity control function 18 (step 424), which will forward the 200 OK message to the CSCF 14 (step 426). The CSCF 14 will send the 200 OK message to the MGC 24 (step 428), which will send an ISUP ANM to the PSTN 22 (step 430), wherein the bearer path is established between the second remote terminal 50 and the PS UA 56 of the mobile terminal 38 via the media gateway 26 (step 432). Again, the MGC 24 will cooperate with the media gateway 26 to establish the bearer path. The bearer path through the PSTN 22 between the second remote terminal 50 and the media gateway 26 may be TDM, wherein the bearer path between the media gateway 26 and the mobile terminal 38 may be VoIP.

With the above, anchoring the mobile terminal 38 in the IMS 12 or like central control domain allows communication sessions and related services to be controlled over different subsystems in a complete and efficient manner. Those skilled in the art will recognize that the call processing options provided herein are merely exemplary and should not limit the overall concepts of anchoring the mobile terminal 38 in a central control domain and providing primary call processing therein. In such an embodiment, call signaling may be provided in one subsystem wherein the bearer path is established in another subsystem. Depending on the status of the mobile terminal 38, the call processing may control existing calls or sessions, as well as new calls or sessions, in a dynamic fashion.

Figure 6:
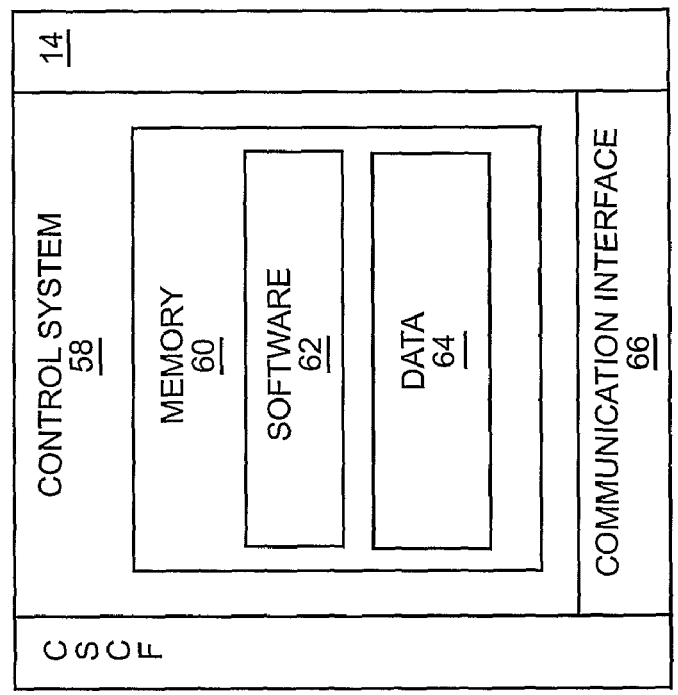
FIG. 6 is a block representation of a call session control function according to one embodiment of the present invention.

With reference to FIG. 6, a CSCF 14 is illustrated. The CSCF 14 will be associated with a control system 58 having sufficient memory 60 for the requisite software 62 and data 64 to operate as described above. The control system 58 will also be associated with a communication interface 66 to facilitate the call signaling described above.

Figure 7:
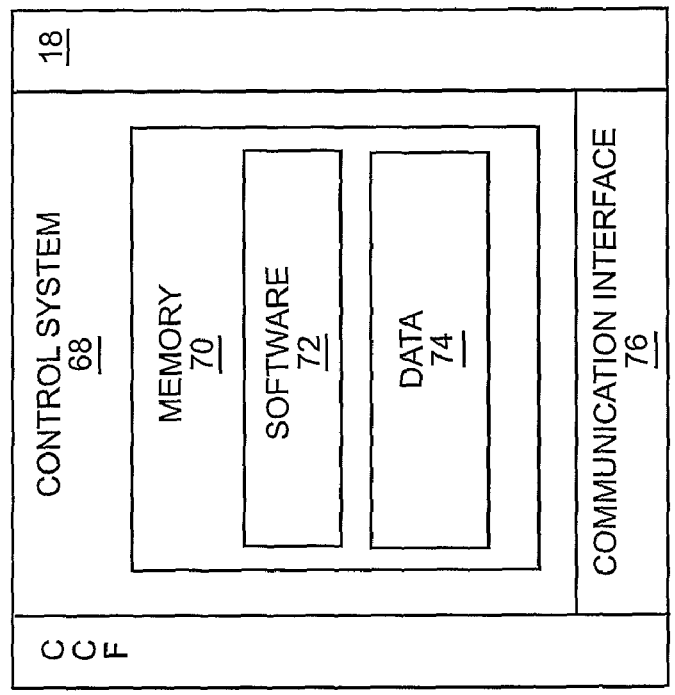
FIG. 7 is a block representation of a continuity control function according to one embodiment of the present invention.

With reference to FIG. 7, a continuity control function 18 is illustrated. The continuity control function 18 will be associated with a control system 68 having sufficient memory 70 for the requisite software 72 and data 74 to operate as described above. The control system 68 will also be associated with a communication interface 76 to facilitate the call signaling described above.

Notably, the functionality of the CSCF 14 and the continuity control function 18 may be implemented alone or in combination on various nodes within the central control domain. Additional functions of the central control domain may also be provided in combination with the functions provided by the CSCF 14 and the continuity control function 18.

Those skilled in the art will recognize improvements and modifications to the preferred embodiments of the present invention. All such improvements and modifications are considered within the scope of the concepts disclosed herein and the claims that follow.

What is claimed is:

1. A method of providing call processing for a mobile terminal in a control subsystem comprising:
   receiving, in the control subsystem, call signaling for a call intended for the mobile terminal, wherein the mobile terminal is anchored in the control subsystem;
   providing to the mobile terminal call signaling for the call via a packet subsystem; and
   effecting establishment of a bearer path to the mobile terminal for the call via a circuit-switched subsystem or via the packet subsystem based on call processing performed by the control subsystem, wherein the control subsystem is a home services subsystem for the mobile terminal and is distinct from both the packet subsystem and the circuit-switched subsystem.

2. The method of claim 1 wherein the packet subsystem and the circuit-switched subsystem are associated with a given cellular access network, which is providing cellular access for the mobile terminal.

3. The method of claim 1 further comprising determining how to route the call upon receiving the call signaling for the call.

4. The method of claim 3 wherein determining how to route the call is based on available bandwidth of at least one packet-based access connection of the mobile terminal.

5. The method of claim 4 wherein when there is insufficient bandwidth to support the bearer path for the call via the at least one packet-based access connection, the bearer path is established via the circuit-switched subsystem.

6. The method of claim 4 wherein when there is sufficient bandwidth to support the bearer path for the call via the at least one packet-based access connection, further comprising establishing the bearer path via the at least one packet-based access connection.

7. The method of claim 5 wherein the at least one packet-based access connection is the packet subsystem.

8. The method of claim 5 wherein the at least one packet-based access connection is provided by local wireless access via a wireless access point.

9. The method of claim 8 further comprising providing the call signaling to the mobile terminal over the local wireless access.

10. The method of claim 8 wherein the local wireless access is distinct from the packet subsystem.

11. The method of claim 1 wherein the call signaling for the call via the packet subsystem is transported using Unstructured Supplementary Service Data (USSD).

12. The method of claim 1 wherein effecting establishment of the bearer path further comprises:
   obtaining a routing number for the mobile terminal from the circuit-switched subsystem; and
   providing call signaling to the circuit-switched subsystem using the routing number to establish the bearer path for the call.

13. The method of claim 1 wherein effecting establishment of the bearer path further comprises routing the call signaling to the circuit-switched subsystem to establish the bearer path for the call, such that the circuit-switched subsystem will determine the routing number for the mobile terminal.

14. A node for providing call processing for a mobile terminal in a control subsystem comprising:
   a communication interface; and
   a control system associated with the communication interface and adapted to:
   receive, in the control subsystem, call signaling for a call intended for the mobile terminal, wherein the mobile terminal is anchored in the control subsystem;
   provide to the mobile terminal call signaling for the call via a packet subsystem; and
   effect establishment of a bearer path to the mobile terminal for the call via a circuit-switched subsystem or via the packet subsystem based on call processing performed by the control subsystem, wherein the control subsystem is a home services subsystem for the mobile terminal and is distinct from both the packet subsystem and the circuit-switched subsystem.

15. The node of claim 14 wherein the packet subsystem and the circuit-switched subsystem are associated with a given cellular access network, which is providing cellular access for the mobile terminal.

16. The node of claim 14 wherein the control system is further adapted to determine how to route the call upon receiving the call signaling for the call.

17. The node of claim 16 wherein determining how to route the call is based on available bandwidth of at least one packet-based access connection of the mobile terminal.

18. The node of claim 17 wherein when there is insufficient bandwidth to support the bearer path for the call via the at least one packet-based access connection, the bearer path is established via the circuit-switched subsystem.

19. The node of claim 17 wherein when there is sufficient bandwidth to support the bearer path for the call via the at least one packet-based access connection, the control system is further adapted to establish the bearer path via the at least one packet-based access connection.

20. The node of claim 19 wherein the at least one packet-based access connection is the packet subsystem.

21. The node of claim 19 wherein the at least one packet-based access connection is provided by local wireless access via a wireless access point.

22. The node of claim 21 wherein the control system is further adapted to provide the call signaling to the mobile terminal over the local wireless access.

23. The node of claim 21 wherein the local wireless access is distinct from the packet subsystem.

24. The node of claim 14 wherein the call signaling for the call via the packet subsystem is transported using Unstructured Supplementary Service Data (USSD).

25. The node of claim 14 wherein to effect establishment of the bearer path the control system is further adapted to:
   obtain a routing number for the mobile terminal from the circuit-switched subsystem; and provide call signaling to the circuit-switched subsystem using the routing number to establish the bearer path for the call.

26. The node of claim 14 wherein to effect establishment of the bearer path the control system is further adapted to route the call signaling to the circuit-switched subsystem to establish the bearer path for the call, such that the circuit-switched subsystem will determine the routing number for the mobile terminal.

* * * * *